(12) United States Patent
Thucanakkenpalayam Sundararajan (10) Patent No.: US 11,899,586 B1
(45) Date of Patent: Feb. 13, 2024

(54) ENERGY EFFICIENT TAG PARTITIONING IN CACHE MEMORY

(71) Applicant: Synopsys, Inc., Mountain View, CA (US)

(72) Inventor: Karthik Thucanakkenpalayam Sundararajan, Fremont, CA (US)

(73) Assignee: Synopsys, Inc., Sunnyvale, CA (US)

( * ) Notice: Subject to any disclaimer, the term of this patent is extended or adjusted under 35 U.S.C. 154(b) by 0 days.

(21) Appl. No.: 17/955,418

(22) Filed: Sep. 28, 2022

(51) Int. Cl.
*G06F 12/0864* (2016.01)
*G06F 12/0846* (2016.01)

(52) U.S. Cl.
CPC ...... *G06F 12/0864* (2013.01); *G06F 12/0848* (2013.01); *G06F 2212/1021* (2013.01)

(58) Field of Classification Search
CPC ............. G06F 12/0864; G06F 12/0848; G06F 2212/1021
See application file for complete search history.

(56) References Cited

U.S. PATENT DOCUMENTS

2004/0225859 A1* 11/2004 Lane .................. G06F 12/0864
711/202
2021/0318958 A1* 10/2021 Pawlowski ......... G06F 12/0284

* cited by examiner

*Primary Examiner* — Gurtej Bansal
(74) *Attorney, Agent, or Firm* — Park, Vaughan, Fleming & Dowler LLP; Laxman Sahasrabuddhe (57) ABSTRACT

A memory address may be received at an m-way set-associative cache, which may store a set of cache entries. The memory address may be partitioned into a tag, an index, and an offset. The m-way set-associative cache may include a first structure to store a first subset of tag bits corresponding to the set of cache entries and a second structure to store a second subset of tag bits corresponding to the set of cache entries. The index may be used to select a first set of entries from the first structure. A first portion of tag bits of the memory address may be matched with the first set of entries. A cache status may be determined based on matching the first portion of tag bits of the memory address with the first set of entries.

20 Claims, 5 Drawing Sheets

ENERGY EFFICIENT TAG PARTITIONING IN CACHE MEMORY

TECHNICAL FIELD

The present disclosure generally relates to integrated circuit (IC) design. More specifically, the present disclosure relates to energy efficient tag partitioning in cache memory.

BACKGROUND

Memory systems are widely used in electronics systems, which may include, but are not limited to, computers and smartphones. Many electronic systems are battery powered, which imposes stringent power constraints on the memory systems. It is desirable to reduce the power consumption and access times of memory systems.

SUMMARY

Embodiments described herein may feature an energy efficient tag partitioning in cache memory, e.g., an m-way set-associative cache which stores a set of cache entries. A memory address may be received at the m-way set-associative cache, where the memory address may be partitioned into a tag, an index, and an offset. The m-way set-associative cache may include a first structure to store a first subset of tag bits corresponding to the set of cache entries and a second structure to store a second subset of tag bits corresponding to the set of cache entries.

The index may be used to select a first set of entries from the first structure. A first portion of tag bits of the memory address may be matched with the first set of entries. Matching the first portion of tag bits of the memory address with the first set of entries may include matching each bit of the first portion of tag bits with a corresponding bit of each entry in the first set of entries.

A cache status may be determined based on matching the first portion of tag bits of the memory address with the first set of entries. In response to the first portion of tag bits of the memory address not matching any entry in first set of entries, a cache miss may be determined. On the other hand, in response to the first portion of tag bits of the memory address matching one or more entries in the first set of entries, a second portion of tag bits of the memory address may be matched with a second set of entries in the second structure corresponding to the one or more entries in the first set of entries.

In response to the second portion of tag bits of the memory address not matching any entry in the second set of entries, a cache miss may be determined. On the other hand, in response to the second portion of tag bits of the memory address matching an entry in the second set of entries, a cache hit may be determined.

In response to determining a cache hit, the offset may be used to retrieve a word from a cache entry corresponding to the matching entry in the second set of entries.

In the event of a cache miss, a memory block may be received, where the memory block corresponds to a first tag and a first index. A first subset of tag bits of the first tag may be stored in the first structure based on the first index. A second subset of tag bits of the first tag may be stored in the second structure based on the first index. The memory block may be stored in a cache entry of the m-way set-associative cache. The first subset of tag bits of the first tag, the second subset of tag bits of the first tag, and the memory block may be stored in the same way of the m-way set-associative cache.

BRIEF DESCRIPTION OF THE FIGURES

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to a system and method for providing energy efficient tag partitioning in cache memory.

Memory access time may refer to the amount of time it takes to access memory contents (e.g., instructions or data stored in a memory). A cache memory (hereinafter "cache") may be used between a processor and a main memory to reduce the memory access time. A cache is typically smaller in size than the main memory but has faster access times than the main memory. Specifically, the cache may be used to store memory contents that are currently being used by a processor or are expected to be used by a processor.

Leakage power consumption of caches may reduce the battery life of electronic devices. It is desirable to reduce the power consumption of caches to increase the battery life of electronic devices.

Embodiments described herein may be able to determine whether the contents of a memory address are present in the cache by using a small portion of the memory address, which may reduce power consumption.

Advantages of embodiments described herein include, but are not limited to, reduction of power consumption of caches without using additional circuitry and without increasing the memory access time.

Figure 1:
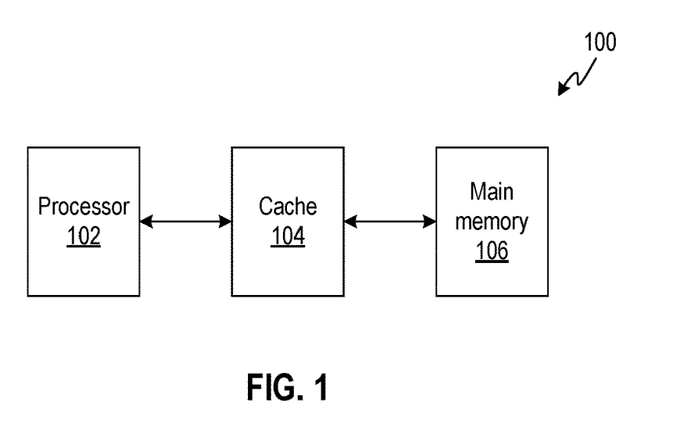
FIG. 1 illustrates an apparatus in accordance with some embodiments described herein.

FIG. 1 illustrates an apparatus in accordance with some embodiments described herein.

In apparatus 100, cache 104 may be coupled to processor 102 and main memory 106. When the processor 102 accesses a memory address, cache 104 may be checked to determine if the contents of the memory address are present in cache 104. If the contents are present in cache 104 (i.e., indicated as a cache hit), then cache 104 may provide the contents of the memory address to processor 102. On the other hand, if the contents of the memory address are not present in cache 104 (indicated as a cache miss), then the contents of the memory address may be retrieved from main memory 106 and may be stored in cache 104 for future access.

Each memory address in the main memory may store a single word of data. A unit of storage in a cache may be referred to as a cache entry, a cache block, or a cache line. A cache may store multiple cache entries, and each cache entry may include one or more words of data. A cache entry may be looked up based on one or more bits of a memory address.

An m-way set-associative cache (e.g., cache 104) may include in ways (where in is an integer greater than or equal to 2), where each way may store a subset of cache entries, and where the in ways may be searched in parallel to determine if a memory address is present in the cache. For example, if the total number of cache entries is E, then each way may store E1m cache entries in an m-way set-associative cache.

Figure 2:
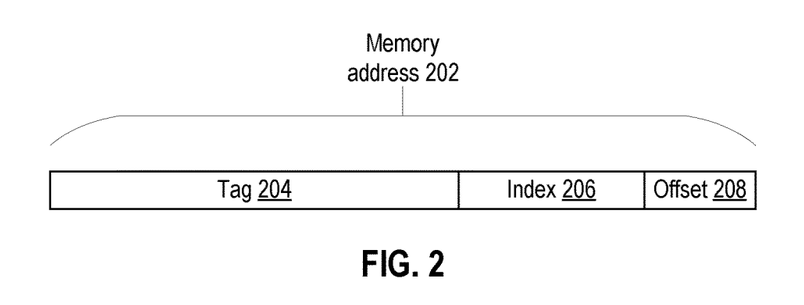
FIG. 2 illustrates a memory address in accordance with some embodiments described herein.

FIG. 2 illustrates a memory address in accordance with some embodiments described herein.

Memory address 202 may be partitioned into three non-overlapping portions: tag 204, index 206, and offset 208. For example, if memory address 202 has n bits, e.g., A[n−1:0], where A[0] is the least significant bit, and A[n−1] is the most significant bit, then offset 208 may correspond to p bits A[p−1:0], index 206 may correspond to q bits A[p+q−1:p], and tag 202 may correspond to r bits A[p+q+r−1:p+q], where p+q+r=n.

In an m-way set-associative cache, when a processor accesses a memory address, the index portion of the memory address may be used to identify a cache entry in each of the in ways. Next, the tag portions corresponding to the in cache entries may be compared with the tag portion 204 of the memory address in parallel. If the tag portion 204 of the memory address matches the tag portion corresponding to a cache entry (i.e., a cache hit), then a word in the cache entry may be selected based on the offset, and the word may be provided from the cache 104 to the processor 102 as shown in FIG. 1. On the other hand, if the tag portion 204 of the memory address does not match the tag portions corresponding to any of the in cache entries (i.e., a cache miss), then the contents of the memory address may be retrieved from the main memory 106.

It is desirable to reduce the power consumption of m-way set-associative caches, e.g., to increase the battery life of electronic devices. Power consumption of an m-way set-associative cache may include leakage power consumption and dynamic power consumption. Dynamic power consumption may primarily depend on the capacitive load and the switching frequency, whereas the leakage power consumption may primarily depend on the amount of circuitry (e.g., the total number of gates in the m-way set-associative cache implementation).

Some approaches may reduce the dynamic power consumption of an m-way set-associative cache by using way prediction and/or hashing. In way prediction, one of the ways is predicted and checked for a cache hit first. If the way prediction is incorrect, then the remaining ways are checked for a cache hit. Way prediction may reduce dynamic power consumption because, when the prediction is correct, only one way is activated out of the in ways to determine if there is a cache hit. Adding way prediction circuitry may increase the leakage power consumption of the m-way set-associative cache because of the additional logic that is added for predicting a way. Moreover, way prediction typically uses two clock cycles if the way prediction is incorrect. Specifically, the predicted way is searched in the first clock cycle and the remaining ways are checked in the second clock cycle if the way prediction is incorrect. Therefore, way prediction may increase the average memory access time.

In hashing, hashing circuitry and a hash structure may be added to the m-way set-associative cache implementation. The hash structure may store a hash entry corresponding to each cache entry. The hashing circuitry may be used to compute a hash value based on the tag portion of a memory address, where the hash value may have substantially fewer bits than the tag portion. Next, the hash entries corresponding to the in cache entries may be compared with the hash value (which was computed based on the tag portion of the memory address) in parallel. If the hash value matches a hash entry corresponding to a cache entry, then the tag portion of the cache entry may be compared with the tag portion of the memory address. Hashing may reduce the dynamic power consumption of the m-way set-associative cache because the dynamic power used for comparing the hash value with the hash entries may be substantially less than the dynamic power used for comparing the tag portion of the memory address with the tag portions of the in cache entries. Adding hashing circuitry may increase the leakage power consumption of the m-way set-associative cache because of the additional hashing circuitry and storage that is added to the m-way set-associative cache implementation.

Embodiments described herein (e.g., cache 104 shown in FIG. 1) can reduce the dynamic power consumption and the leakage power consumption of an m-way set-associative cache without increasing the memory access time. In some embodiments, the tag portion of a memory address corresponding to a cache entry may be partitioned into a first subset of tag bits which may be stored in a first structure, and a second subset of tag bits which may be stored in a second structure. Thus, each cache entry may correspond to an entry in the first structure and an entry in the second structure. The first subset of tag bits may be compared with the entries in the first structure. If the first subset of tag bits matches an entry in the first structure, then the second subset of tag bits may be compared with a corresponding entry in the second structure. If the second subset of tag bits matches the corresponding entry in the second structure, then a cache hit may be determined. The process of matching the first subset of tag bits and the second subset of tag bits may be performed in a single clock cycle.

Advantages of embodiments described herein include, but are not limited to, reduction of leakage power consumption and dynamic power consumption of an m-way set-associative cache without using additional circuitry (e.g., hashing circuitry) or storage (e.g., a hash structure) and without increasing the memory access time.

Figure 3:
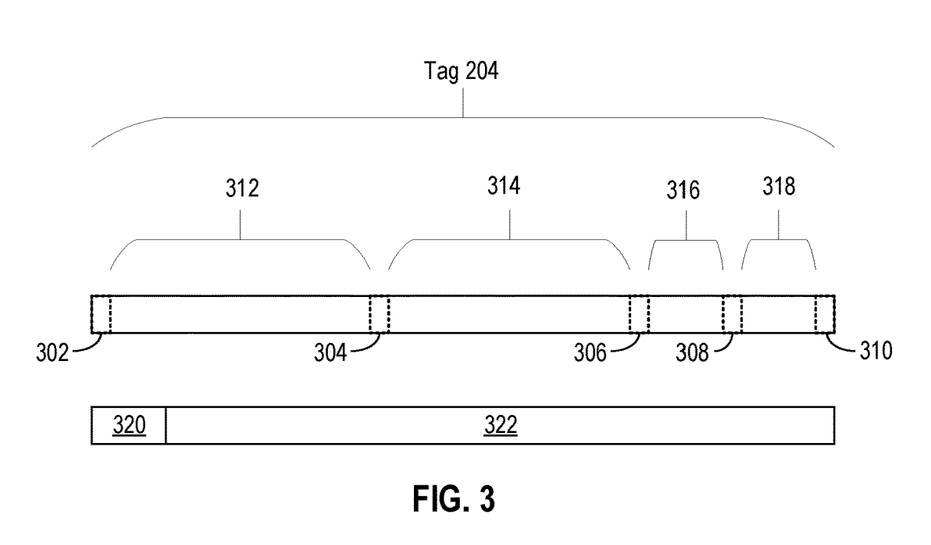
FIG. 3 illustrates partitioning a tag into a first set of tag bits and a second set of tag bits in accordance with some embodiments described herein.

FIG. 3 illustrates partitioning a tag into a first set of tag bits and a second set of tag bits in accordance with some embodiments described herein.

Bits of tag 204 may be partitioned into two subsets: a first subset of tag bits 320 and a second subset of tag bits 322. In FIG. 3, the first subset of tag bits 320 includes bits 302, 304, 306, 308, and 310, and the second subset of tag bits 322 includes bits 312, 314, 316, and 318.

The number of bits in the first subset of tag bits 320 may be less than the number of bits in the second subset of tag bits 322. For example, for a tag that is 32 bits long, the first subset of tag bits 320 may include eight bits (which may be contiguous or non-contiguous) from the tag 204, and the second subset of tag bits 322 may include the remaining 24 bits.

In some embodiments, the cache may include two separate m-way set-associative caches that correspond to even and odd memory addresses. In these embodiments, the least significant bit of the tag may be used to access one of the two m-way set-associative caches. In these embodiments, the remaining bits of the tag may be partitioned into two groups as explained above.

Figure 4:
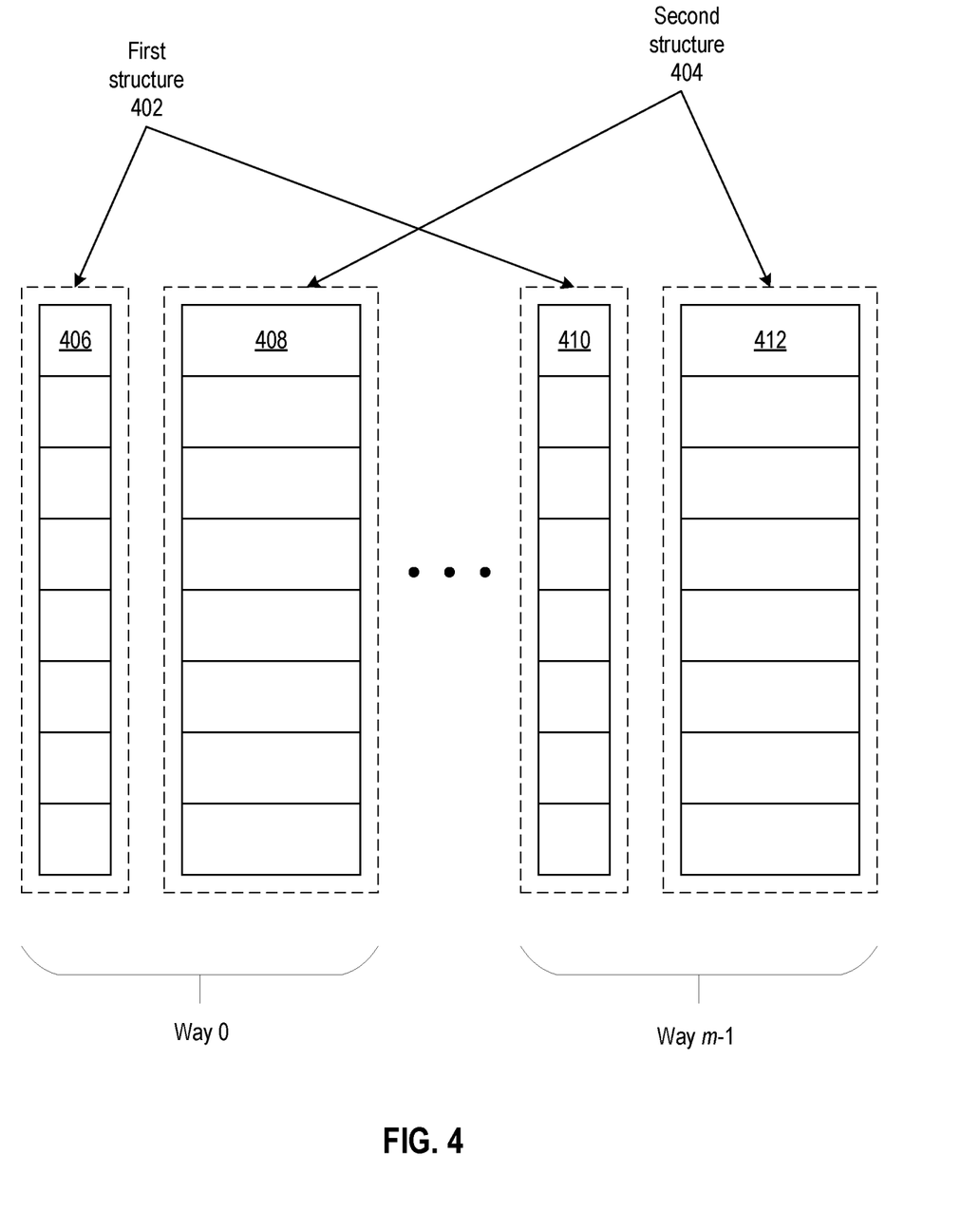
FIG. 4 illustrates a first structure and a second structure to store tag bits in accordance with some embodiments described herein.

FIG. 4 illustrates a first structure and a second structure to store tag bits in accordance with some embodiments described herein.

Each way may include a subset of cache entries, and each cache entry may be associated with a unique tag. For a given cache entry, the tag bits may be partitioned into a first subset of tag bits and a second subset of tag bits (e.g., the first subset of tag bits 320 and the second subset of tag bits 322 shown in FIG. 3). The first subset of tag bits corresponding to the cache entries in the m ways may be stored in first structure 402, and the second subset of tag bits corresponding to the cache entries in the m ways may be stored in second structure 404. The structure that stores the cache entries is not shown in FIG. 4. In some embodiments, the structure that stores cache entries may be implemented as a lookup table, where each entry in the lookup table may store a cache entry, where each cache entry may store one or more words of data, and where the lookup table may be looked up using the index portion of a memory address (e.g., index 206 in memory address 202 shown in FIG. 2).

For example, first subset of tag bits 406 and second subset of tag bits 408 may be extracted from a tag corresponding to a cache entry stored in way and first subset of tag bits 410 and second subset of tag bits 412 may be extracted from a tag corresponding to a cache entry stored in way m−1. First subset of tag bits 406 and first subset of tag bits 410 may be stored in first structure 402 and second subset of tag bits 408 and second subset of tag bits 412 may be stored in second structure 404.

Structures 402 and 404 may be indexed based on the index portion of a memory address (e.g., index 206 in memory address 202 shown in FIG. 2). For example, first subset of tag bits 406 and 410 in structure 402 and second subset of tag bits 408 and 412 in structure 404 may correspond to the same index.

Figure 5:
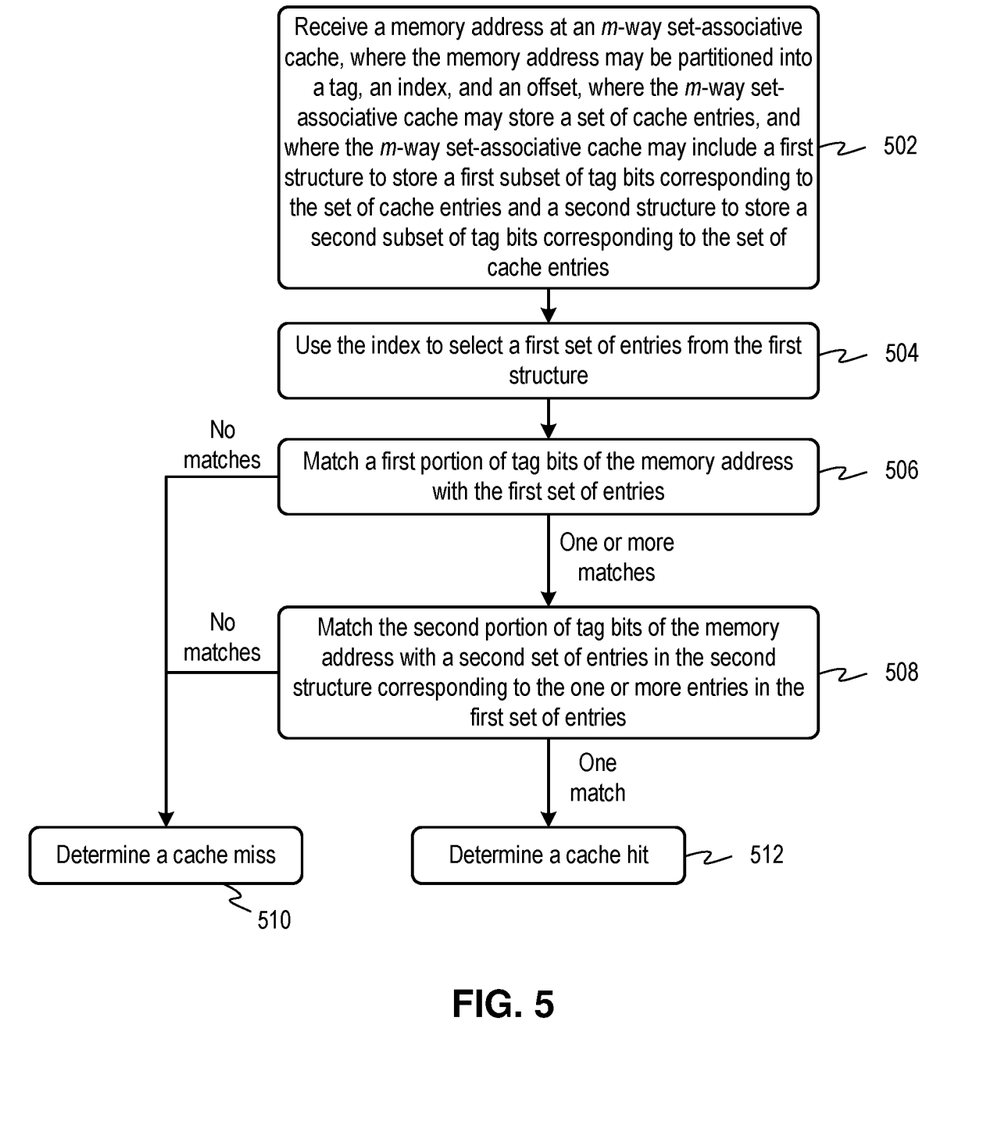
FIGS. 5-6 illustrates a process for determining a cache hit or a cache miss in accordance with some embodiments described herein.
Figure 6:
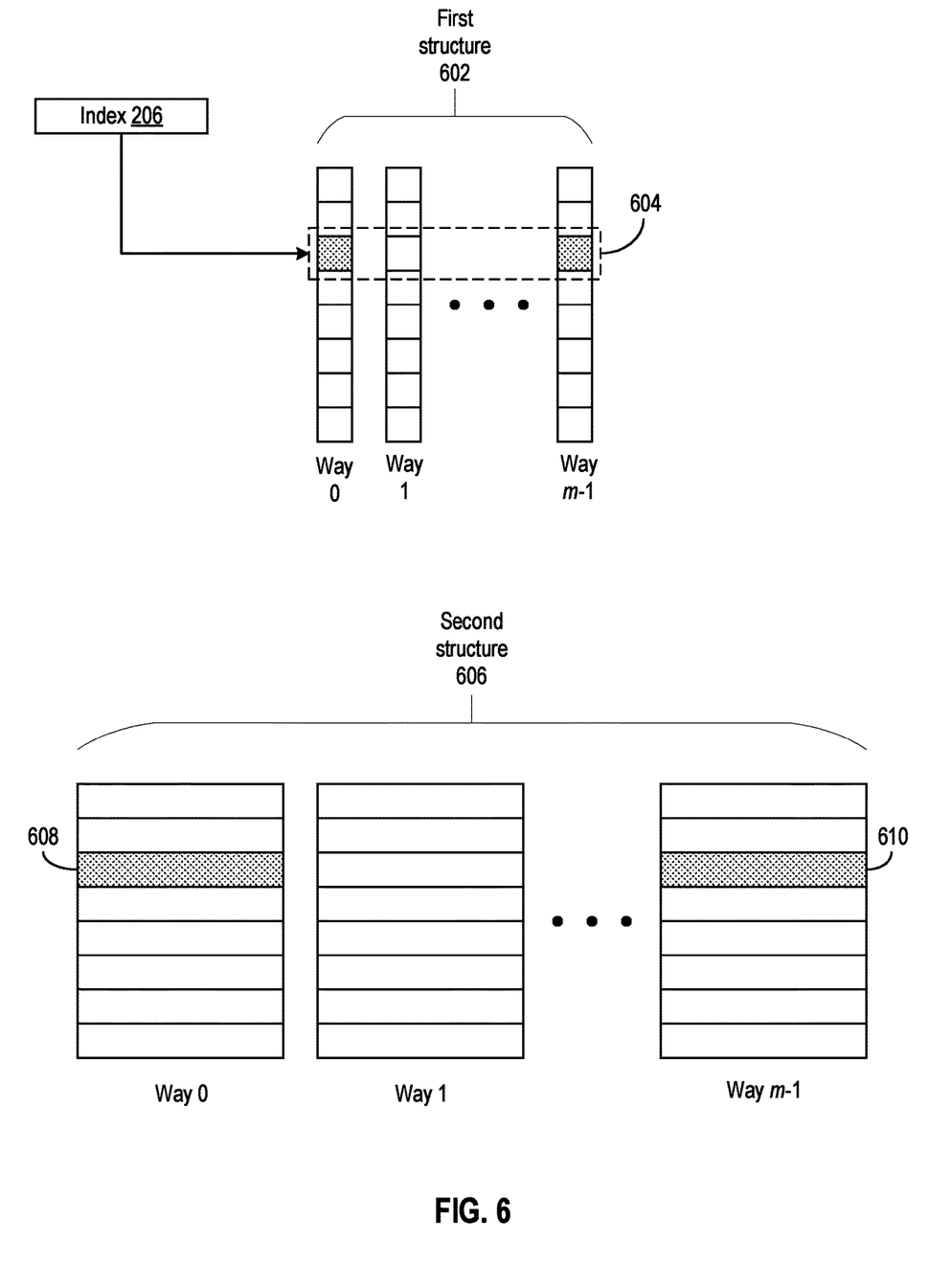

FIGS. 5-6 illustrates a process for determining a cache hit or a cache miss in accordance with some embodiments described herein.

A memory address may be received at an m-way set-associative cache, where the memory address may be partitioned into a tag, an index, and an offset, where the m-way set-associative cache stores a set of cache entries, and where the m-way set-associative cache includes a first structure to store a first subset of tag bits corresponding to the set of cache entries and a second structure to store a second subset of tag bits corresponding to the set of cache entries (at 502).

For example, in FIG. 2, memory address 202 may be partitioned into tag 204, index 206, and offset 208. As shown in FIG. 6, first structure 602 may store a first subset of tag bits corresponding to the set of cache entries, and second structure 606 may store a second subset of tag bits corresponding to the set of cache entries. The structure that stores the cache entries is not shown in FIG. 6.

The index may be used to select a first set of entries from the first structure (at 504). For example, in FIG. 6, index 206 may be used to select a set of entries 604 from first structure 602.

A first portion of tag bits of the memory address may be matched with the first set of entries (at 506). For example, the first subset of tag bits 320 in FIG. 3 may be matched with each entry in the set of entries 604 in parallel. Matching the first subset of tag bits 320 with an entry in the set of entries 604 may include matching each bit of the first subset of tag bits 320 with a corresponding bit of an entry in the set of entries 604.

A cache status may be determined based on matching the first portion of tag bits of the memory address with the first set of entries. If the first portion of tag bits of the memory address does not match any entry in the first set of entries 604 (the "No matches" branch from 506), a cache miss may be determined (at 510). For example, if the first subset of tag bits 320 in FIG. 3 does not match any entry in the set of entries 604, then a cache miss may be determined.

On the other hand, if the first portion of tag bits of the memory address match one or more entries in the first set of entries (the "One or more matches" branch from 506), then the second portion of tag bits of the memory address may be matched with a second set of entries in the second structure corresponding to the one or more entries in the first set of entries (at 508).

For example, suppose the first subset of tag bits 320 in FIG. 3 matches the way 0 and m−1 entries (shaded in FIG. 6) in the set of entries 604. Then, the second subset of tag bits 322 in FIG. 3 may be matched with entries 608 and 610 in second structure 606, where entries 608 and 610 correspond to the two entries in the set of entries 604 that matched the first subset of tag bits 320. Matching the second subset of tag bits 322 with entry 608 (and likewise with entry 610) may include matching each bit of the second subset of tag bits 322 with a corresponding bit of entry 608.

If the second portion of tag bits of the memory address does not match any entry in the second set of entries (the "No matches" branch from 508), then a cache miss may be determined (at 510). For example, if the second subset of tag bits 322 in FIG. 3 does not match entries 608 or 610, then a cache miss may be determined.

On the other hand, if the second portion of tag bits of the memory address match an entry in the second set of entries (the "One match" branch from 508), then a cache hit may be determined (at 512). For example, if the second subset of tag bits 322 in FIG. 3 matches either entry 608 or 610, then a cache hit may be determined. The process illustrated in FIG. 6 may be performed in a single clock cycle. In other words, a cache miss (at 510) or a cache hit (at 512) may be determined in the same clock cycle in which the memory address was received (at 502).

If a cache hit is determined (e.g., at 512), then the offset portion of the memory address (e.g., offset 208 in memory address 202 shown in FIG. 2) may be used to retrieve a word from a cache entry corresponding to the matching entry in the second set of entries. For example, if the second subset of tag bits 322 in FIG. 3 matched entry 608, then the cache entry corresponding to entry 608 may be identified by indexing into the way 0 cache using index 206, and the offset 208 may be used to select a word from the cache entry.

If a cache miss is determined (e.g., at 510), then the contents of a memory block may be retrieved from main memory and stored in a cache entry for future accesses. Specifically, the memory block may correspond to a first tag and a first index. The first index may be used store the memory block in a cache entry in one of the m ways. Additionally, the first index may be used to store a first subset of tag bits of the first tag in the first structure (e.g., first structure 602) and store a second subset of tag bits of the first tag in the second structure (e.g., second structure 604). The retrieved memory block may include the contents of a set of memory addresses that includes the desired memory address. Specifically, the size of the memory block depends on the number of bits in the offset. For example, if the offset has 4 bits, then each memory block (which is the same size as each cache block) has contents from 16 memory addresses.

Figure 7:
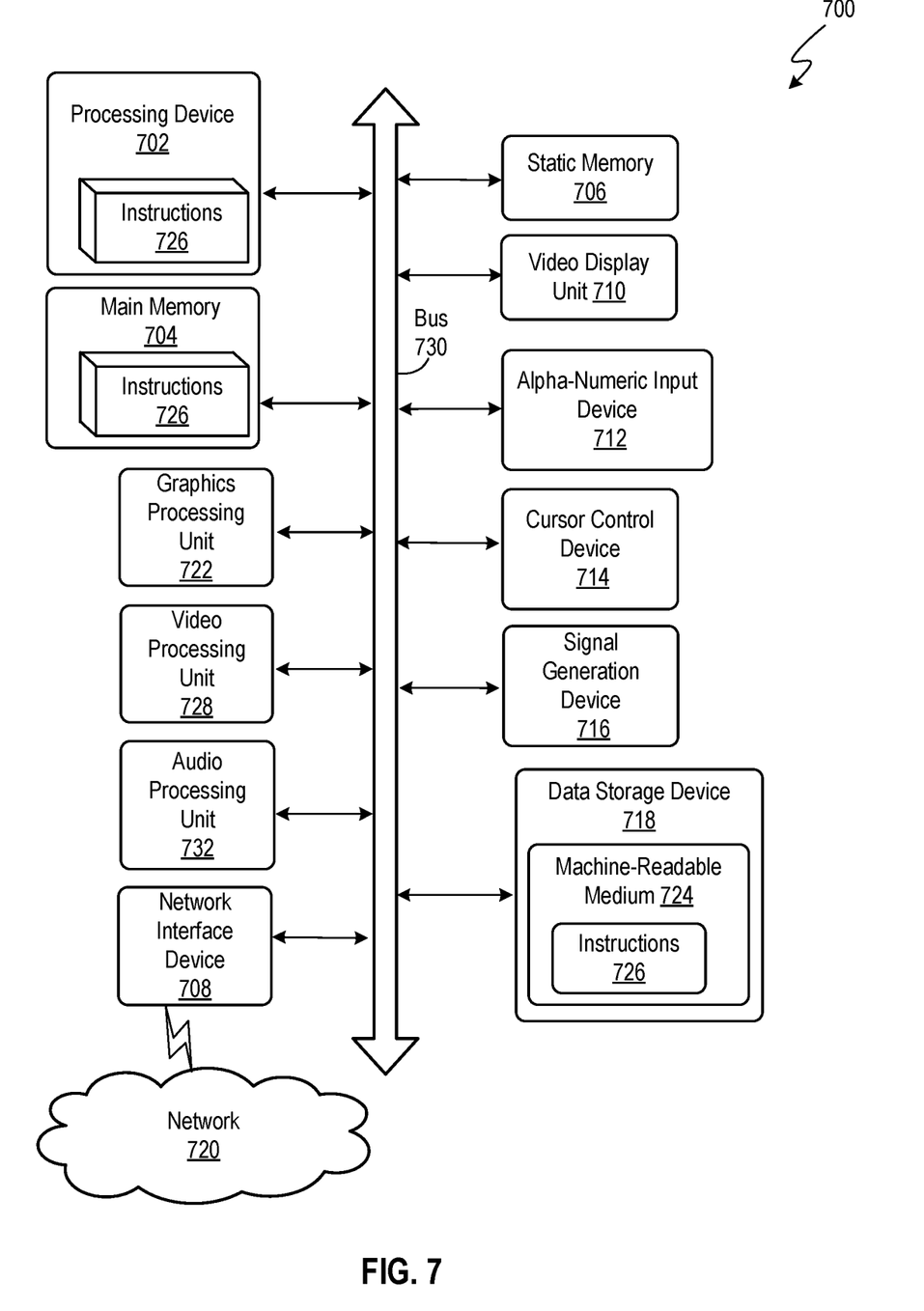
FIG. 7 illustrates an example machine of a computer system within which a set of instructions, for causing the machine to perform any one or more of the methodologies discussed herein, may be executed.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
    receiving a memory address at an m-way set-associative cache, wherein the memory address is partitioned into a tag, an index, and an offset, wherein the m-way set-associative cache stores a set of cache entries, and wherein the m-way set-associative cache includes a first structure to store a first subset of tag bits corresponding to the set of cache entries and a second structure to store a second subset of tag bits corresponding to the set of cache entries;
    using the index to select m entries in the first structure;
    matching a first portion of tag bits of the memory address with the m entries in the first structure; and
    in response to the first portion of tag bits of the memory address matching n entries in the first structure, where n is less than m, matching a second portion of tag bits of the memory address with n entries in the second structure corresponding to the n entries in the first structure; and
    wherein the matching the first portion of tag bits of the memory address with the m entries in the first structure and the matching the second portion of tag bits of the memory address with n entries in the second structure is performed in a single clock cycle.

2. The method of claim 1, further comprising:
    in response to the first portion of tag bits of the memory address not matching any entry in the m entries, determining a cache miss; and
    in response to the second portion of tag bits of the memory address not matching any entry in the n entries in the second structure, determining a cache miss.

3. The method of claim 2, further comprising:
    in response to the second portion of tag bits of the memory address matching an entry in the n entries in the second structure, determining a cache hit.

4. The method of claim 3, further comprising:
    in response to determining a cache hit, using the offset to retrieve a word from a cache entry corresponding to the matching entry in the n entries in the second structure.

5. The method of claim 1, wherein the matching the first portion of tag bits of the memory address with the m entries in the first structure comprises matching each bit of the first portion of tag bits with a corresponding bit of each entry in the m entries in the first structure.

6. The method of claim 1, further comprising:
    receiving a memory block, wherein the memory block corresponds to a first tag and a first index;
    storing a first subset of tag bits of the first tag in the first structure based on the first index; and
    storing a second subset of tag bits of the first tag in the second structure based on the first index.

7. The method of claim 6, further comprising:
    storing the memory block in the m-way set-associative cache.

8. An integrated circuit (IC), comprising:
    a first circuit to store a set of cache entries, wherein each cache entry includes one or more words of data, wherein each word of data corresponds to a memory address, and wherein the memory address is partitioned into a tag, an index, and an offset;
    a first structure to store a first subset of tag bits corresponding to the set of cache entries;
    a second structure to store a second subset of tag bits corresponding to the set of cache entries; and
    a second circuit to:
        use the index to select m entries in the first structure;
        match a first portion of tag bits of the memory address with the m entries in the first structure;
        in response to the first portion of tag bits of the memory address matching n entries in the first structure, where n is less than m, match a second portion of tag bits of the memory address with n entries in the second structure corresponding to the n entries in the first structure; and
        wherein the matching the first portion of tag bits of the memory address with the m entries in the first structure and the matching the second portion of tag bits of the memory address with n entries in the second structure is performed in a single clock cycle.

9. The IC of claim 8, wherein the second circuit to:
    in response to the first portion of tag bits of the memory address not matching any entry in the m entries, determine a cache miss; and
    in response to the second portion of tag bits of the memory address not matching any entry in the n entries in the second structure, determine a cache miss.

10. The IC of claim 9, wherein the second circuit to:
    in response to the second portion of tag bits of the memory address matching an entry in the n entries in the second structure, determine a cache hit.

11. The IC of claim 10, wherein the second circuit to:
    in response to determining a cache hit, using the offset to retrieve a word from a cache entry corresponding to the matching entry in the n entries in the second structure.

12. The IC of claim 8, wherein matching the portion of tag bits of the memory address with the m entries in the first structure comprises matching each bit of the first portion of tag bits with a corresponding bit of each entry in the first set of entries.

13. The IC of claim 8, further comprising:
    a third circuit to:
        receive a memory block, wherein the memory block corresponds to a first tag and a first index;
        store a first subset of tag bits of the first tag in the first structure based on the first index; and store a second subset of tag bits of the first tag in the second structure based on the first index.

14. The IC of claim 13, wherein the third circuit to: store the memory block in the first circuit.

15. An apparatus, comprising:
a processor;
a main memory; and
a m-way set-associative cache coupled to the processor and the main memory, the m-way set-associative cache comprising:
 a first circuit to store a set of cache entries, wherein each cache entry includes one or more words of data, wherein each word of data corresponds to a memory address, and wherein the memory address is partitioned into a tag, an index, and an offset;
 a first structure to store a first subset of tag bits corresponding to the set of cache entries;
 a second structure to store a second subset of tag bits corresponding to the set of cache entries; and
 a second circuit to:
  use the index to select m entries in the first structure;
  match a first portion of tag bits of the memory address with the m entries in the first structure by matching each bit of the first portion of tag bits with a corresponding bit of each entry in the m entries in the first structure;
  in response to the first portion of tag bits of the memory address matching n entries in the first structure, where n is less than m, match a second portion of tag bits of the memory address with n entries in the second structure corresponding to the n entries in the first structure; and
  wherein the matching the first portion of tag bits of the memory address with the m entries in the first structure and the matching the second portion of tag bits of the memory address with n entries in the second structure is performed in a single clock cycle.

16. The apparatus of claim 15, wherein the second circuit to:
 determine a cache miss in response to the first portion of tag bits of the memory address not matching any entry in the m entries; and
 determine a cache miss in response to the second portion of tag bits of the memory address not matching any entry in the n entries in the second structure.

17. The apparatus of claim 16, wherein the second circuit to:
 determine a cache hit in response to the second portion of tag bits of the memory address matching an entry in the n entries in the second structure.

18. The apparatus of claim 17, wherein the second circuit to:
 use the offset to retrieve a word from a cache entry corresponding to the matching entry in the n entries in the second structure in response to determining a cache hit.

19. The apparatus of claim 15, wherein the m-way set-associative cache further comprising:
 a third circuit to:
  receive a memory block, wherein the memory block corresponds to a first tag and a first index;
  store a first subset of tag bits of the first tag in the first structure based on the first index; and
  store a second subset of tag bits of the first tag in the second structure based on the first index.

20. The apparatus of claim 19, wherein third circuit to: store the memory block in the first circuit.

* * * * *